(12) United States Patent
Nakamura et al.

(10) Patent No.: US 12,235,433 B2
(45) Date of Patent: Feb. 25, 2025

(54) SOLID IMMERSION LENS UNIT AND SEMICONDUCTOR INSPECTION DEVICE

(71) Applicant: HAMAMATSU PHOTONICS K.K., Hamamatsu (JP)

(72) Inventors: Tomonori Nakamura, Hamamatsu (JP); Ikuo Arata, Hamamatsu (JP); Xiangguang Mao, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 536 days.

(21) Appl. No.: 17/634,036

(22) PCT Filed: Jul. 16, 2020

(86) PCT No.: PCT/JP2020/027686
§ 371 (c)(1),
(2) Date: Feb. 9, 2022

(87) PCT Pub. No.: WO2021/079574
PCT Pub. Date: Apr. 29, 2021

(65) Prior Publication Data
US 2022/0326501 A1    Oct. 13, 2022

(30) Foreign Application Priority Data
Oct. 24, 2019   (JP) .................................. 2019-193496

(51) Int. Cl.
*G02B 21/33*     (2006.01)
*G02B 7/02*      (2021.01)

(52) U.S. Cl.
CPC .............. *G02B 21/33* (2013.01); *G02B 7/02* (2013.01)

(58) Field of Classification Search
CPC .......... G02B 21/33; G02B 7/02; G02B 21/00; G02B 7/021; G02B 21/02; G02B 2003/0093
See application file for complete search history.

(56) References Cited

U.S. PATENT DOCUMENTS 6,236,513 B1    5/2001   Mallary
6,594,430 B1    7/2003   Rausch et al.
(Continued)

FOREIGN PATENT DOCUMENTS

CN    1875308 A    12/2006
CN    102403000 A   4/2012
(Continued)

OTHER PUBLICATIONS

English-language translation of International Preliminary Report on Patentability (IPRP) dated May 5, 2022 that issued in WO Patent Application No. PCT/JP2020/027686.

*Primary Examiner* — Mustak Choudhury
(74) *Attorney, Agent, or Firm* — Faegre Drinker Biddle & Reath LLP

(57) ABSTRACT

A solid immersion lens unit includes a solid immersion lens and a holder for swingably holding the solid immersion lens. The solid immersion lens includes a first lens portion formed of a first material, and a second lens portion formed of a second material having a refractive index smaller than a refractive index of the first material and coupled to the first lens portion. The first lens portion includes a contact surface for contacting with an observation object and a convex first spherical surface. The second lens portion includes a concave second spherical surface facing the first spherical surface and a convex third spherical surface to be disposed to face an objective lens. The holder has a contact portion configured to be contactable with the third spherical surface.

8 Claims, 11 Drawing Sheets

(56) References Cited

U.S. PATENT DOCUMENTS

| | | | |
|---|---|---|---|
| 7,576,910 B2* | 8/2009 | Terada | G01N 21/9501 359/383 |
| 2002/0044235 A1* | 4/2002 | Yamada | G02B 6/4214 349/189 |
| 2003/0123155 A1 | 7/2003 | Quake et al. | |
| 2004/0085626 A1 | 5/2004 | Nishimura et al. | |
| 2004/0150895 A1* | 8/2004 | Yamada | G02B 6/4214 359/796 |
| 2004/0150896 A1* | 8/2004 | Yamada | G02B 3/0087 359/796 |
| 2005/0180028 A1* | 8/2005 | Yamada | G02B 6/4214 359/796 |
| 2006/0182001 A1* | 8/2006 | Isobe | G02B 21/02 369/112.24 |
| 2006/0209432 A1* | 9/2006 | Yamada | G02B 3/0087 359/796 |
| 2019/0391379 A1* | 12/2019 | Nakamura | G02B 21/02 |

FOREIGN PATENT DOCUMENTS

| | | | |
|---|---|---|---|
| CN | 110062903 A | | 7/2019 |
| EP | 3557297 A1 | | 10/2019 |
| JP | 2001076366 A | * | 3/2001 |
| JP | 2001-311803 A | | 11/2001 |
| JP | 2012-048774 A | | 3/2012 |
| KR | 20030032751 A | | 4/2003 |
| KR | 100393772 B1 | | 8/2003 |
| TW | 201109759 A | | 3/2011 |
| TW | 201614303 A | | 4/2016 |
| WO | WO-2018/110221 A1 | | 6/2018 |

\* cited by examiner (a)

(b)

SOLID IMMERSION LENS UNIT AND SEMICONDUCTOR INSPECTION DEVICE

TECHNICAL FIELD

One aspect of the present disclosure relates to a solid immersion lens unit and a semiconductor inspection device.

BACKGROUND ART

In a semiconductor device, an internal structure is being miniaturized at a level below a wavelength of light. At the same time, in the semiconductor device, the number of wiring layers is increasing. Therefore, when the semiconductor device is observed, the internal structure is observed from a surface on the opposite side from the device (integrated circuit, etc.) side in the semiconductor device. In this observation, due to constraint by a bandgap of a substrate material of the semiconductor device, shortening of the wavelength of light is limited, and as a result, a size of the observable internal structure is also limited.

In order to solve such a problem and implement observation of the internal structure with high resolution, a solid immersion lens (SIL) may be used. The solid immersion lens is formed of a material having a refractive index substantially equal to or close to that of the substrate material of the semiconductor device. By bringing a contact surface of the solid immersion lens into close contact with a surface of the semiconductor device to implement evanescent coupling, it is possible to implement observation of the internal structure with high resolution. For example, Patent Literature 1 describes a technology for swingably holding a solid immersion lens using spheres, so that a contact surface of the solid immersion lens can be brought into close contact with a surface of an observation object even when the surface of the observation object is tilted.

CITATION LIST

Patent Literature

Patent Literature 1: International Publication WO 2018/110221

SUMMARY OF INVENTION

Technical Problem

For the above-described observation, light having a wavelength not absorbed by the solid immersion lens and the observation object is used. However, it is conceivable to use light having a short wavelength absorbed by the solid immersion lens to some extent. In this case, not only the resolution can be increased, but also various measurements can be performed by utilizing generation of electric charges due to the absorption of light in the observation object.

Meanwhile, since a part of light is absorbed by the solid immersion lens, it is necessary to form the solid immersion lens thin in order to ensure the amount of light passing through the solid immersion lens and reaching the observation object. When the solid immersion lens is formed thin, a diameter of the solid immersion lens becomes small. Here, when a contact portion (sphere) is brought into contact with the solid immersion lens for close contact with the observation object of the solid immersion lens as in the related technology described above, a part of light incident on the solid immersion lens is blocked by the contact portion and a structure holding the contact portion. Therefore, when the solid immersion lens is thinly formed in order to use light having a short wavelength, it may be difficult to ensure a sufficient field of view of the solid immersion lens.

One aspect of the present disclosure is to provide a solid immersion lens unit and a semiconductor inspection device capable of ensuring a field of view of the solid immersion lens while enabling observation using light having a short wavelength.

Solution to Problem

A solid immersion lens unit according to an aspect of the present disclosure includes a solid immersion lens, and a holder for swingably holding the solid immersion lens, in which the solid immersion lens includes a first lens portion formed of a first material, and a second lens portion formed of a second material having a refractive index smaller than a refractive index of the first material and coupled to the first lens portion, the first lens portion includes a contact surface for contacting with an observation object and a convex first spherical surface, the second lens portion includes a concave second spherical surface facing the first spherical surface and a convex third spherical surface to be disposed to face an objective lens, and the holder has a contact portion configured to be contactable with the third spherical surface.

In this solid immersion lens unit, the solid immersion lens includes a first lens portion formed of a first material, and a second lens portion formed of a second material having a refractive index smaller than a refractive index of the first material and coupled to the first lens portion. In this way, a material having a wider bandgap than that of the first material can be selected as the second material. Therefore, for example, when compared to the case where the entire solid immersion lens is formed of the first material, even when light having a short wavelength is used, it is possible to easily ensure the amount of light transmitted through the solid immersion lens. Further, the second lens portion has the concave second spherical surface facing the convex first spherical surface of the first lens portion, and the convex third spherical surface disposed to face the objective lens, and the contact portion of the holder comes into contact with the third spherical surface. In this way, the contact portion comes into contact with the solid immersion lens on the third spherical surface wider than the first spherical surface, so that the field of view of the solid immersion lens can be ensured. Therefore, according to the solid immersion lens unit, it is possible to ensure the field of view of the solid immersion lens while enabling observation using light having a short wavelength.

Centers of curvature of the first spherical surface, the second spherical surface, and the third spherical surface may coincide with each other. In this case, the observation object containing the first material can be favorably observed.

The contact surface may be a flat surface. In this case, the contact surface can be easily brought into close contact with the surface of the observation object.

The contact surface may protrude to an opposite side from the objective lens with respect to the second lens portion in a direction parallel to an optical axis of the objective lens. In this case, it is possible to avoid a decrease in observation accuracy due to the contact of the second lens portion with the observation object.

The first material may be Si, GaAs, GaP, Ge, diamond, SiC, or GaN. In this case, the observation object can be observed with high resolution.

The second material may be glass, polymer, sapphire, quartz, calcium fluoride, or magnesium fluoride. In this way, as the second material, it is possible to select a material having a lower refractive index than that of the first material.

The contact portion may include a sphere rotatably held at a position facing the third spherical surface. In this case, a part of light incident on the solid immersion lens is blocked by the sphere and a structure that holds the sphere. However, in this solid immersion lens unit, as described above, since the contact portion comes into contact with the solid immersion lens on the third spherical surface wider than the first spherical surface, the field of view of the solid immersion lens can be ensured.

The holder may be formed with an opening in which the second lens portion disposed, and the contact portion may include a protrusion extending from an inner surface of the opening toward a center of the opening. In this case, a part of light incident on the solid immersion lens is blocked by the protrusion. However, in this solid immersion lens unit, as described above, since the contact portion comes into contact with the solid immersion lens on the third spherical surface wider than the first spherical surface, the field of view of the solid immersion lens can be ensured.

A semiconductor inspection device according to an aspect of the present disclosure includes a stage on which a semiconductor device is placed, the semiconductor device being the observation object, an optical system through which light from the semiconductor device passes, and a photodetector for detecting the light passing through the optical system, and the optical system includes an objective lens, and the solid immersion lens unit. In this semiconductor inspection device, for the reason described above, it is possible to ensure the field of view of the solid immersion lens while enabling observation using light having a short wavelength, so that the semiconductor device can be favorably inspected.

Advantageous Effects of Invention

According to one aspect of the present disclosure, it is possible to provide a solid immersion lens unit and a semiconductor inspection device capable of ensuring a field of view of the solid immersion lens while enabling observation using light having a short wavelength.

DESCRIPTION OF EMBODIMENTS

Figure 1:
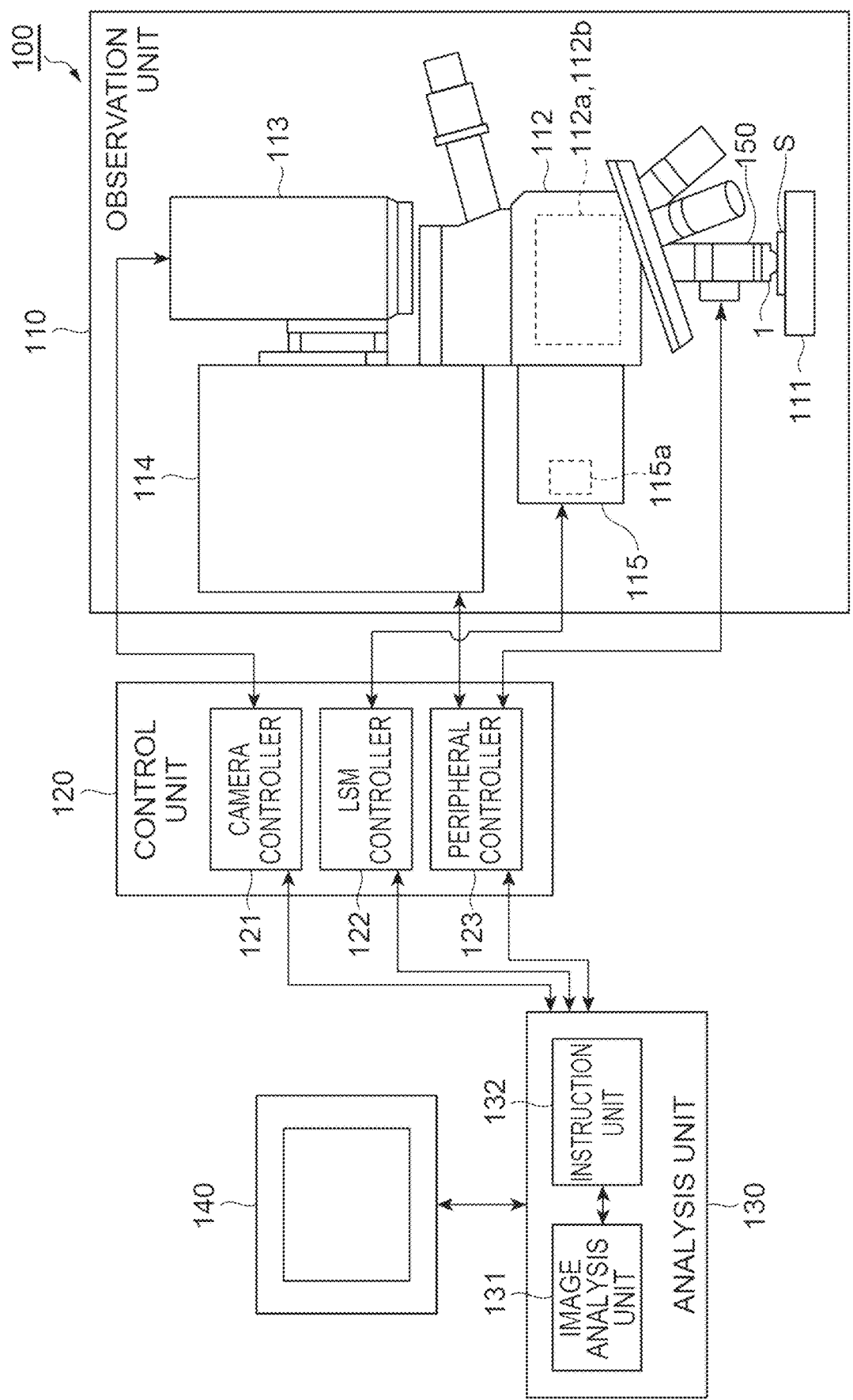
FIG. 1 is a configuration diagram of a semiconductor inspection device according to an embodiment.

Hereinafter, an embodiment of the present disclosure will be described in detail with reference to the drawings. Note that in the following description, the same reference numerals will be used for the same or equivalent elements, and duplicate description will be omitted.

[Configuration of Semiconductor Inspection Device]

A semiconductor inspection device 100 illustrated in FIG. 1 is a device that acquires an image of a semiconductor device (observation object) S and inspects internal information of the semiconductor device S. The semiconductor device S is formed, for example, by incorporating a plurality of elements on a silicon substrate. That is, the semiconductor device S includes the silicon substrate. The semiconductor device S is, for example, an individual semiconductor element (discrete), an optoelectronic element, a sensor/actuator, a logic LSI (Large Scale Integration), a memory element, a linear IC (Integrated Circuit), or a mixed device thereof. The individual semiconductor element includes a diode, a power transistor, etc. The logic LSI includes a transistor having a MOS (Metal-Oxide-Semiconductor) structure, a transistor having a bipolar structure, etc. Further, the semiconductor device S may be a package including the semiconductor device, a composite substrate, etc.

Figure 2:
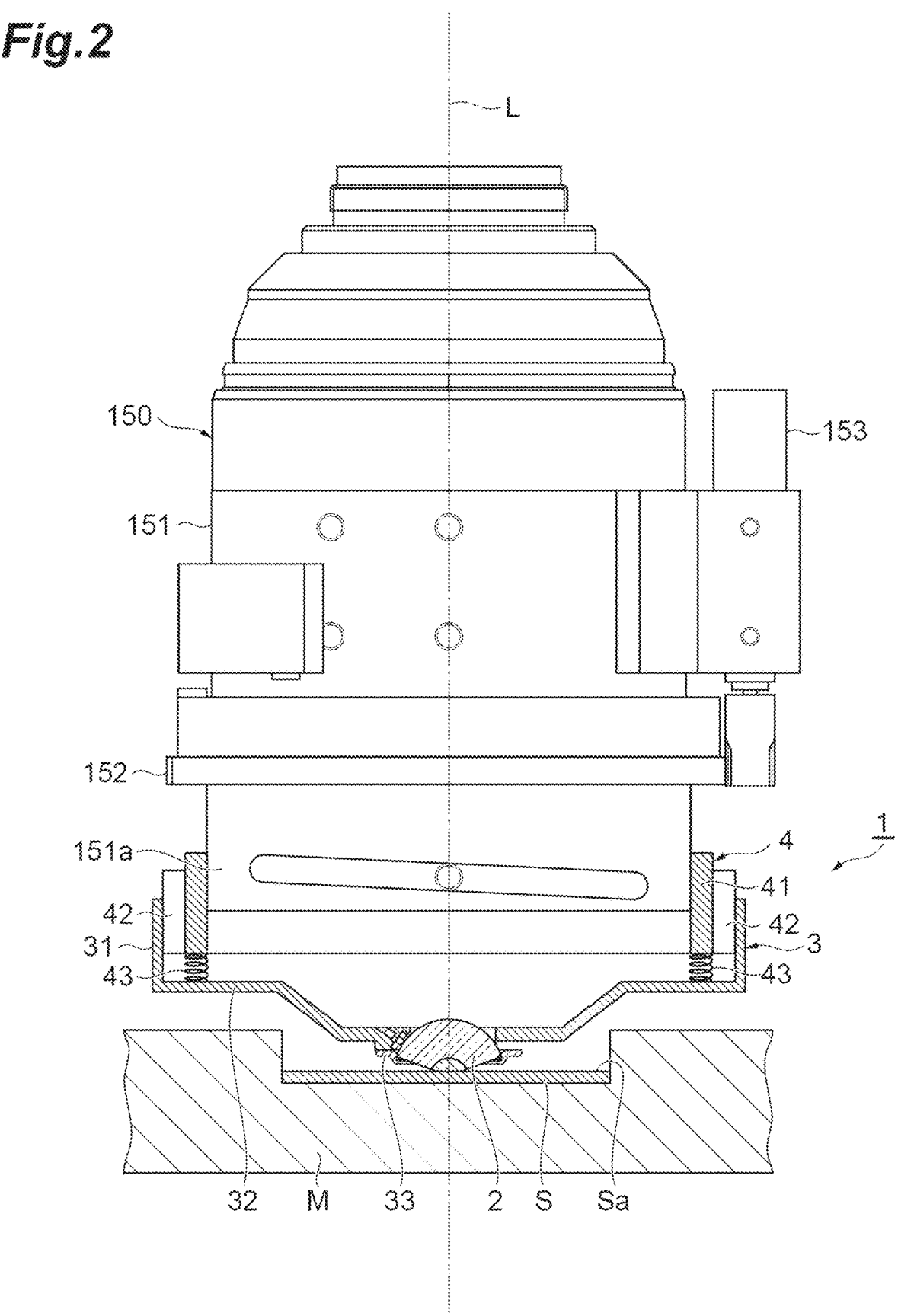
FIG. 2 is a cross-sectional view of a solid immersion lens unit.

The internal information to be inspected includes information on a circuit pattern of the semiconductor device S, information on weak light emission from the semiconductor device S (light emission due to a defect in the semiconductor device S, transient light emission due to switching operation of a transistor in the semiconductor device S, etc.), information on heat generation due to a defect in the semiconductor device, etc. As illustrated in FIG. 2, the semiconductor device S may be molded by a resin M so that a surface Sa is exposed, and may form a molded semiconductor device. The surface Sa is a surface on the opposite side from the device (integrated circuit, etc.) side in the semiconductor device S, and is, for example, a flat surface.

An image acquired by the semiconductor inspection device 100 may include an OBIC (Optical Beam Induced Current) image, a LADA (Laser Assisted Device Alteration) image, and a TR-LADA (Time Resolved Laser Assisted Device Alteration) image. The OBIC image is obtained by detecting a photogenic current generated by a laser beam as a characteristic value (current value or current change value) of an electric signal, and imaging the characteristic value in association with laser irradiation position information. The LADA image is acquired by scanning laser light in a state where a test pattern is applied to the semiconductor device S to detect a malfunction state, thereby imaging malfunction information as multi-valued correct/incorrect information for a laser irradiation position on the semiconductor device S. The TR-LADA image is acquired by synchronizing a pulse laser irradiating the semiconductor device S with a test pattern applied to the semiconductor device S to image malfunction information at a specific timing.

As illustrated in FIG. 1, the semiconductor inspection device 100 includes an observation unit 110, a control unit 120, an analysis unit 130, and a display device 140. The observation unit 110 observes the semiconductor device S. The control unit 120 controls an operation of the observation unit 110. The analysis unit 130 performs processing, instructions, etc. necessary for inspecting the semiconductor device S. The display device 140 is electrically connected to the analysis unit 130, and displays images, data, etc. acquired or analyzed by the analysis unit 130. The display device 140 is, for example, a display.

The observation unit 110 includes a stage 111, an optical system 112, a two-dimensional camera (photodetector) 113, a moving mechanism 114, and an LSM (Laser Scanning Microscope) unit 115. The semiconductor device S is placed on the stage 111 with the surface Sa facing the optical system 112 side. The moving mechanism 114 moves the optical system 112, the two-dimensional camera 113, and the LSM unit 115.

The optical system 112 includes a plurality of objective lenses 150, a camera optical system 112a, and an LSM unit optical system 112b. The magnifications of the respective objective lenses 150 are different from each other. Each of the objective lenses 150 is disposed to face the surface Sa of the semiconductor device S placed on the stage 111. As illustrated in FIG. 2, a correction ring 152 and a correction ring adjustment motor 153 are attached to the objective lens 150. By driving the correction ring adjustment motor 153 to adjust the correction ring 152, the objective lens 150 can be reliably focused on a portion desired to be observed.

As illustrated in FIG. 1, the camera optical system 112a guides light from the semiconductor device S to the two-dimensional camera 113. The two-dimensional camera 113 detects light guided by the camera optical system 112a (light passing through the optical system 112). The two-dimensional camera 113 can output image data for creating an image such as the circuit pattern of the semiconductor device S. For example, a CCD area image sensor, a CMOS area image sensor, etc. are mounted on the two-dimensional camera 113. The two-dimensional camera 113 may be, for example, an InGaAs camera, an InSb camera, an MCT camera, etc.

The LSM unit optical system 112b guides laser light output from the LSM unit 115 to the semiconductor device S, and guides laser light reflected by the semiconductor device S to the LSM unit 115. The LSM unit optical system 112b has an optical scanning unit such as a galvano mirror, a polygon mirror, or a MEMS mirror, and scans laser beam with respect to the semiconductor device S. The LSM unit 115 emits laser light generated by a light source, and detects laser light reflected by the semiconductor device S using the photodetector 115a.

The light source may generate, for example, CW (Continuous Wave) light or pulsed light that irradiates the semiconductor device S. Light generated by the light source may be not only coherent light such as laser light but also incoherent (non-coherent) light. As a light source that outputs coherent light, it is possible to use a solid-state laser light source, a semiconductor laser light source, etc. Further, as a light source that outputs incoherent light, it is possible to use an SLD (Super Luminescent Diode), ASE (Amplified Spontaneous Emission), an LED (Light Emitting Diode), etc.

The light source may output light in a wavelength range not absorbed by the semiconductor device S. For example, when the semiconductor device S includes a silicon substrate, the light source may output light of 1,300 nm or more. When acquiring the above-mentioned OBIC image, LADA image, or TR-LADA image, the light source may output light in a wavelength range in which electric charges are generated by light absorption in the semiconductor device S. For example, when the semiconductor device S includes a silicon substrate, the light source may output light in a wavelength range of 1,100 nm or less or 1,200 nm or less (for example, laser light in a wavelength band of about 1,064 nm).

The photodetector 115a is, for example, an avalanche photodiode, a photodiode, a photomultiplier tube, a superconducting single photon detector, etc. The intensity of laser light detected by the photodetector 115a reflects the circuit pattern of the semiconductor device S. Therefore, the photodetector 115a can output image data for creating an image such as a circuit pattern of the semiconductor device S.

The control unit 120 includes a camera controller 121, an LSM controller 122, and a peripheral controller 123. The camera controller 121 is electrically connected to the two-dimensional camera 113. The LSM controller 122 is electrically connected to the LSM unit 115. The camera controller 121 and the LSM controller 122 control operations of the two-dimensional camera 113 and the LSM unit 115, respectively, to control execution of observation of the semiconductor device S (acquisition of an image), setting of an observation condition of the semiconductor device S, etc.

The peripheral controller 123 is electrically connected to the moving mechanism 114. The peripheral controller 123 controls the operation of the moving mechanism 114 to control movements of the optical system 112, the two-dimensional camera 113, and the LSM unit 115, alignment thereof, etc. The peripheral controller 123 is electrically connected to the correction ring adjustment motor 153 (see FIG. 2). The peripheral controller 123 controls drive of the correction ring adjustment motor 153 to control adjustment of the correction ring 152 (see FIG. 2).

The analysis unit 130 includes an image analysis unit 131 and an instruction unit 132. The analysis unit 130 includes a computer having a processor (CPU), and a RAM and a ROM as recording media. The analysis unit 130 is electrically connected to each of the camera controller 121, the LSM controller 122, and the peripheral controller 123. The image analysis unit 131 creates an image based on image data output from each of the camera controller 121 and the LSM controller 122, and executes analysis processing, etc. The instruction unit 132 refers to input content by an operator, analysis content by the image analysis unit 131, etc., and gives an instruction to the control unit 120 with regard to execution of inspection of the semiconductor device S by the observation unit 110. An operation unit (not illustrated) is electrically connected to the analysis unit 130. A user operates the operation unit to operate the semiconductor inspection device 100. The operation unit is, for example, a mouse, a keyboard, etc. Further, the operation unit may be, for example, a touch panel built in the display device 140.

[Configuration of Solid Immersion Lens Unit]

The optical system 112 further includes a solid immersion lens unit 1 in addition to the above-mentioned objective lenses 150, etc. As illustrated in FIG. 2, the solid immersion lens unit 1 includes a solid immersion lens 2, a holder 3, and a support mechanism 4. In the following description, in a state where the objective lens 150 faces the surface Sa of the semiconductor device S placed on the stage 111, a side where the objective lens 150 is located with respect to the semiconductor device S is set to an upper side, and a side where the semiconductor device S is located with respect to the objective lens 150 is set to a lower side.

The holder 3 swingably holds the solid immersion lens 2. The holder 3 has a side wall 31, a bottom wall 32, and a support member 33. The side wall 31 has a tubular shape. The bottom wall 32 is integrally formed with the side wall 31 so as to close an opening on a lower side of the side wall 31. The support member 33 is attached to the bottom wall 32 from a lower side. The side wall 31, the bottom wall 32, and the support member 33 are made of a non-magnetic material (for example, aluminum, aluminum alloy, non-magnetic stainless steel, etc.).

The support mechanism 4 movably supports the holder 3 in a direction parallel to an optical axis L of the objective lens 150. The support mechanism 4 has an attached member 41, a plurality of linear guides 42, and a plurality of compression coil springs 43. The attached member 41 has a tubular shape and is attached a lower end 151a of a lens barrel 151 of the objective lens 150. The plurality of linear guides 42 is disposed between an outer surface of the attached member 41 and an inner surface of the side wall 31 of the holder 3. The plurality of linear guides 42 is disposed at equal pitches around the optical axis L. The plurality of compression coil springs 43 is disposed between a lower end surface of the attached member 41 and an upper surface of the bottom wall 32 of the holder 3. The plurality of compression coil springs 43 is disposed around the optical axis L at equal pitches. In this way, when an external force is applied to the holder 3 from the lower side, the holder 3 moves upward from an initial position against an urging force of the plurality of compression coil springs 43, and when the external force is removed from the holder 3, the holder 3 returns to the initial position by the urging force of the plurality of compression coil springs 43.

[Configuration of Solid Immersion Lens]

Figure 3:
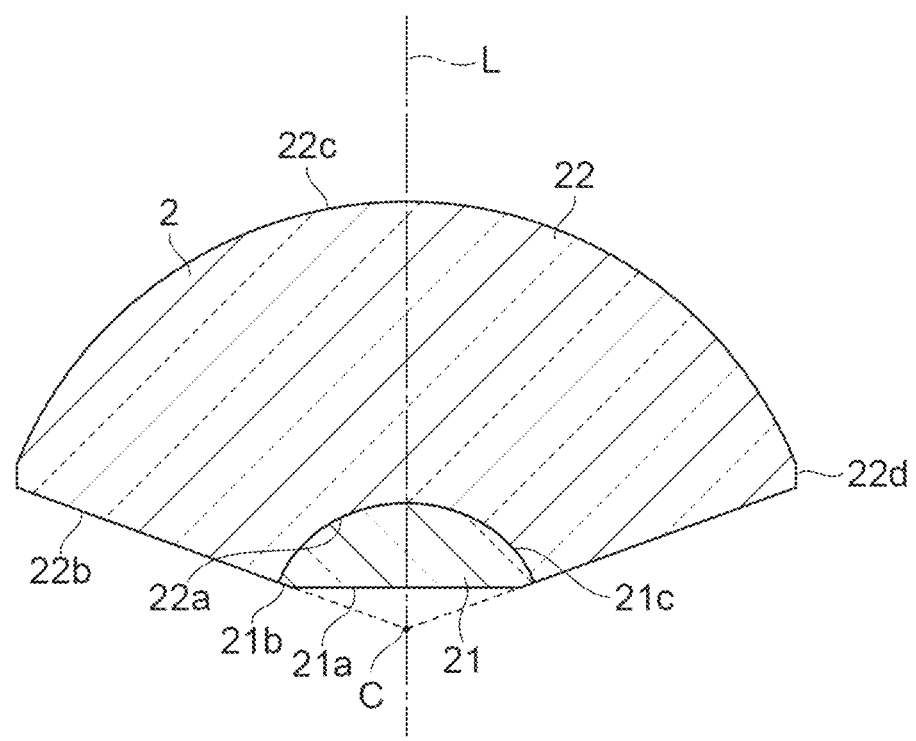
FIG. 3 is a cross-sectional view of a solid immersion lens.

As illustrated in FIG. 3, the solid immersion lens 2 has a first lens portion 21 and a second lens portion 22. The first lens portion 21 includes a contact surface 21a, a first tapered surface 21b, and a first spherical surface 21c. The contact surface 21a is a flat surface and is brought into contact with the surface Sa of the semiconductor device S. The first tapered surface 21b is a truncated cone-shaped surface that extends upward, and extends upward from an outer edge of the contact surface 21a. The first spherical surface 21c is a convex and hemispherical surface curved toward the upper side, and extends from an edge of the first tapered surface 21b so as to oppose the contact surface 21a. An outer diameter of the first lens portion 21 is, for example, about 1.5 mm to 2.0 mm. A center of curvature of the first spherical surface 21c and an apex of a virtual cone including the first tapered surface 21b coincide with a spherical center C of the solid immersion lens and are located on the optical axis L below the contact surface 21a. The spherical center C of the solid immersion lens coincides with a focal point of the solid immersion lens 2.

The second lens portion 22 includes a second spherical surface 22a, a second tapered surface 22b, a third spherical surface 22c, and a peripheral surface 22d. The second spherical surface 22a is a concave and hemispherical surface curved toward the upper side. The second spherical surface 22a faces the first spherical surface 21c of the first lens portion 21 and extends along the first spherical surface 21c. The second tapered surface 22b is a truncated cone-shaped surface that extends upward, and extends upward from the outer edge of the second spherical surface 22a. The second tapered surface 22b is flush with the first tapered surface 21b and forms one truncated cone-shaped surface together with the first tapered surface 21b. The third spherical surface 22c is a convex and hemispherical surface curved toward the upper side, and is disposed to face the objective lens 150. The peripheral surface 22d is a cylindrical surface, and is connected to an outer edge of the second tapered surface 22b and an outer edge of the third spherical surface 22c. Centers of curvature of the second spherical surface 22a and the third spherical surface 22c coincide with the center of curvature of the first spherical surface 21c (the spherical center C of the solid immersion lens). An apex of a virtual cone including the second tapered surface 22b coincides with the spherical center C of the solid immersion lens.

Since the first lens portion 21 has the first tapered surface 21b, the contact surface 21a of the first lens portion 21 projects downward (opposite side from the objective lens 150) with respect to the second lens portion 22 in a direction parallel to the optical axis L of the objective lens 150. In other words, in the solid immersion lens 2, the contact surface 21a is located on a lowermost side, and a boundary between the first lens portion 21 and the second lens portion 22 is not located on a plane on which the contact surface 21a is disposed.

The first lens portion 21 is formed of a first material having a refractive index substantially equal to or close to a refractive index of a substrate material (silicon (Si) in this example) of the semiconductor device S. The first material is, for example, Si, GaP (gallium phosphide), GaAs (gallium arsenide), Ge (germanium), diamond, SiC, or GaN (gallium nitride). The refractive indexes of Si, GaP, GaAs, Ge, diamond, SiC, and GaN are 3.5, 3.2, 3.5, 4.0, 2.4, 2.6, and 2.4, respectively. The second lens portion 22 is formed of a second material having a refractive index larger than a refractive index of air (atmosphere) and smaller than the refractive index of the first material. The second material is, for example, glass, polymer, sapphire, quartz, calcium fluoride, magnesium fluoride, etc. The refractive indexes of glass, polymer, sapphire, quartz, calcium fluoride, and magnesium fluoride are 1.5 to 2.0, 1.5 to 1.6, 1.8, 1.5, 1.4, and 1.4, respectively.

The first lens portion 21 and the second lens portion 22 are coupled to each other by an adhesive provided between the first spherical surface 21c and the second spherical surface 22a. The first lens portion 21 and the second lens portion 22 are bonded so that the centers of curvature of the first spherical surface 21c, the second spherical surface 22a, and the third spherical surface 22c coincide with each other. The adhesive is provided over the entire surface of, for example, the first spherical surface 21c and the second spherical surface 22a. As the adhesive, it is possible to use an adhesive having a refractive index closer to the refractive index of the second material than the refractive index of the first material. In this way, light is easily transmitted through the solid immersion lens 2. A first antireflection film (AR coating) may be provided between the first spherical surface 21c and the adhesive. The first antireflection film is provided, for example, over the entire surface of the first spherical surface 21c. A second antireflection film may be provided on the third spherical surface 22c. The second antireflection film is provided, for example, over the entire surface of the third spherical surface 22c.

[Holding Structure of Solid Immersion Lens]

Figure 4:
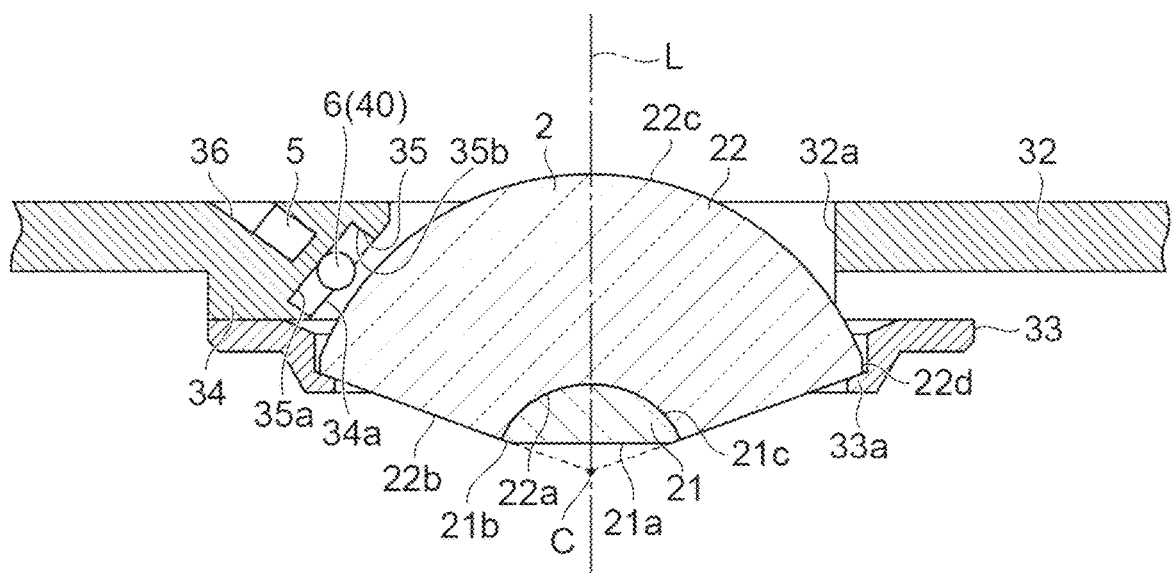
FIG. 4 is a cross-sectional view of a part of the solid immersion lens unit.
Figure 5:
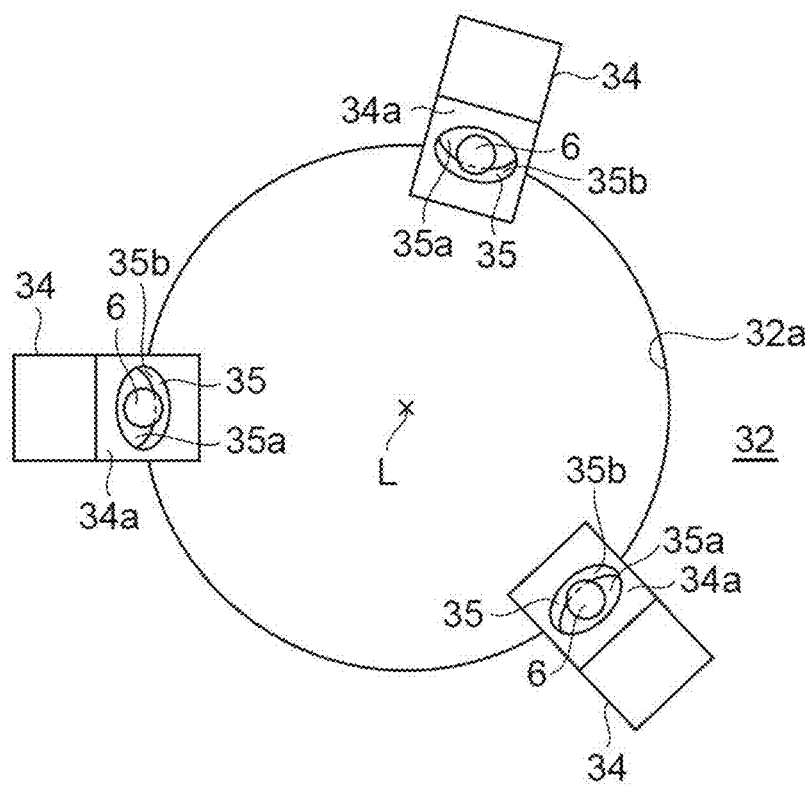
FIG. 5 is a bottom view of a bottom wall of a holder of the solid immersion lens unit.

As illustrated in FIG. 2, the solid immersion lens 2 is held by the holder 3 so as to be located on the optical axis L on the lower side (front side) of the objective lens 150. As illustrated in FIGS. 4 and 5, an opening 32a is formed in the bottom wall 32. A shape of the opening 32a when viewed from a direction parallel to the optical axis L is, for example, a circular shape with the optical axis L as a center line, and an inner diameter thereof is smaller than an outer diameter of the solid immersion lens 2 (outer diameter of the peripheral surface 22d). A plurality of protrusions 34 is provided on an edge of the opening 32a. The plurality of protrusions 34 extends from the edge of the opening 32a toward a center of the opening 32a. The plurality of protrusions 34 is integrally formed with the bottom wall 32 by a non-magnetic material. The plurality of protrusions 34 is disposed around the optical axis L at equal pitches. In the present embodiment, three protrusions 34 are disposed around the optical axis L at a pitch of 120°.

The support member 33 has an annular shape, and is attached to the bottom wall 32 from the lower side, for example, by being screwed to each of the protrusions 34. A shape of an opening of the support member 33 when viewed from a direction parallel to the optical axis L is, for example, a circular shape with the optical axis L as a center line, and an inner diameter thereof is slightly larger than the outer diameter of the solid immersion lens 2. An inward flange 33a is integrally formed at a lower end of the support member 33. A shape of an opening of the inward flange 33a when viewed from a direction parallel to the optical axis L is, for example, a circular shape with the optical axis L as a center line, and an inner diameter thereof is smaller than the outer diameter of the solid immersion lens 2.

The solid immersion lens 2 is disposed so that the contact surface 21a protrudes downward from the opening of the inward flange 33a and the peripheral surface 22d is located inside the opening of the support member 33. In this state, since the inner diameter of the opening of the support member 33 is slightly larger than the outer diameter of the solid immersion lens 2, while movement of the solid immersion lens 2 in a direction perpendicular to the optical axis L is restricted, movement of the solid immersion lens 2 in the direction parallel to the optical axis L and swing of the solid immersion lens 2 (for example, moving to tilt by about 1° with respect to the optical axis L) are allowed. Further, since the inner diameter of the opening of the inward flange 33a is smaller than the outer diameter of the solid immersion lens 2, the solid immersion lens 2 is prevented from falling off to the lower side.

A plurality of accommodating holes 36 is formed on the upper surface of the bottom wall 32. The plurality of accommodating holes 36 is disposed to correspond to the plurality of protrusions 34, respectively. A magnet 5 is accommodated in each of the accommodating holes 36. Each magnet 5 has, for example, a cylindrical shape, and a center line thereof is directed toward the spherical center C of the solid immersion lens 2. As described above, the holder 3 is provided with a plurality of magnets 5.

An inclined surface 34a is formed on each protrusion 34. Each inclined surface 34a faces the third spherical surface 22c of the solid immersion lens 2. An accommodating portion 35 is formed on each inclined surface 34a. Each accommodating portion 35 is, for example, a cylindrical recess. The magnet 5 is provided in the holder 3 to face a central portion of the accommodating portion 35. For example, a center line of the accommodating portion 35 coincides with the center line of the magnet 5 accommodated in the corresponding accommodating hole 36. The bottom surface 35a of each accommodating portion 35 is a flat surface and faces the third spherical surface 22c of the solid immersion lens 2. A side surface 35b of each accommodating portion 35 has a cylindrical shape. A distance between the bottom surface 35a and the inclined surface 34a (that is, a height of the side surface 35b) is smaller than a diameter of a sphere 6. As described above, the holder 3 is provided with a plurality of accommodating portions 35.

Each accommodating portion 35 accommodates the sphere 6. Each sphere 6 functions as a contact portion 40 in contact with the third spherical surface 22c of the solid immersion lens 2. Each sphere 6 is made of a magnetic material (for example, nickel, cobalt, iron, stainless steel, etc.). In each accommodating portion 35, the sphere 6 is rotatably held at a center of the bottom surface 35a (position facing the third spherical surface 22c of the solid immersion lens 2) by a magnetic force of the magnet 5 accommodated in the corresponding accommodating hole 36. In this state, a part of the sphere 6 protrudes from the accommodating portion 35. In the present embodiment, three spheres 6 are disposed around the optical axis L at a pitch of 120°.

As illustrated in FIG. 4, in a state where an outer edge of the second tapered surface 22b of the solid immersion lens 2 is in contact with the inward flange 33a of the support member 33, a gap is formed between the third spherical surface 22c of the solid immersion lens 2 and each sphere 6. In this way, when the solid immersion lens 2 moves upward, the third spherical surface 22c of the solid immersion lens 2 comes into contact with the plurality of spheres 6. Therefore, while the solid immersion lens 2 is prevented from moving further upward, the solid immersion lens 2 is allowed to swing. As described above, the holder 3 swingably holds the solid immersion lens 2 in a state where the third spherical surface 22c of the solid immersion lens 2 is in contact with the plurality of spheres 6.

An inner surface (at least the bottom surface 35a) of each accommodating portion 35 may be subjected to a hardening treatment. The inner surface of each accommodating portion 35 is a region of the surface of the holder 3 with which at least the sphere 6 is in contact. The hardening treatment is a treatment in which the hardness of the surface of the holder 3 (in the present embodiment, the inner surface of each accommodating portion 35) is made higher than the hardness of the inside of the holder 3 (in the present embodiment, the inside of each protrusion 34). For example, when each protrusion 34 is made of aluminum or an aluminum alloy, an alumite treatment can be used as the hardening treatment. For the hardening treatment, it is preferable to select a treatment in accordance with a material forming each protrusion 34.

[Example of Image Acquisition Method in Semiconductor Inspection Device]

As illustrated in FIG. 1, in the semiconductor inspection device 100, an observation part in the semiconductor device S is specified by the objective lens 150 to which the solid immersion lens unit 1 is not attached. This observation part is specified by an instruction to the peripheral controller 123 by the instruction unit 132 and control of drive of the moving mechanism 114 by the peripheral controller 123.

Subsequently, switching to the objective lens 150 to which the solid immersion lens unit 1 is attached is performed, and the correction ring 152 of the objective lens 150 is adjusted. The correction ring 152 is adjusted by an instruction to the peripheral controller 123 by the instruction unit 132 and control of drive of the correction ring adjustment motor 153 by the peripheral controller 123. Specifically, the correction ring 152 is adjusted in accordance with a characteristic of the solid immersion lens 2 (thickness and refractive index of each part of the solid immersion lens 2, etc.), a substrate thickness of the semiconductor device S, a substrate material of the semiconductor device S, etc.

Subsequently, the contact surface 21a (see FIG. 3) of the solid immersion lens 2 is brought into close contact with the surface Sa of the semiconductor device S. The contact surface 21a of the solid immersion lens 2 is brought into close contact by an instruction to the peripheral controller 123 by the instruction unit 132 and control of drive of the moving mechanism 114 by the peripheral controller 123.

Subsequently, focusing of the objective lens 150 to which the solid immersion lens unit 1 is attached is performed. The focusing of the objective lens 150 is performed by an instruction to the peripheral controller 123 by the instruction unit 132 and control of drive of the moving mechanism 114 by the peripheral controller 123.

Subsequently, the observation part in the semiconductor device S is observed. This observation part is observed by an instruction to each of the camera controller 121 and the LSM controller 122 by the instruction unit 132, and control of an operation of each of the two-dimensional camera 113 and the LSM unit 115.

Figure 6:
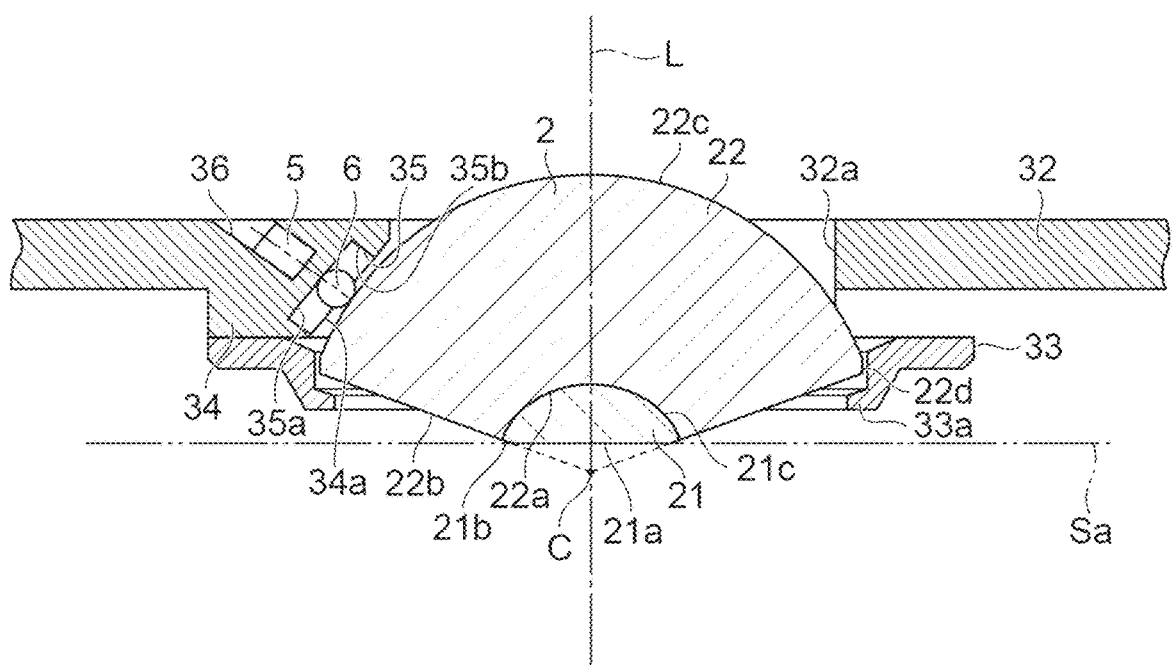
FIG. 6 is a cross-sectional view of a part of the solid immersion lens unit.
Figure 7:
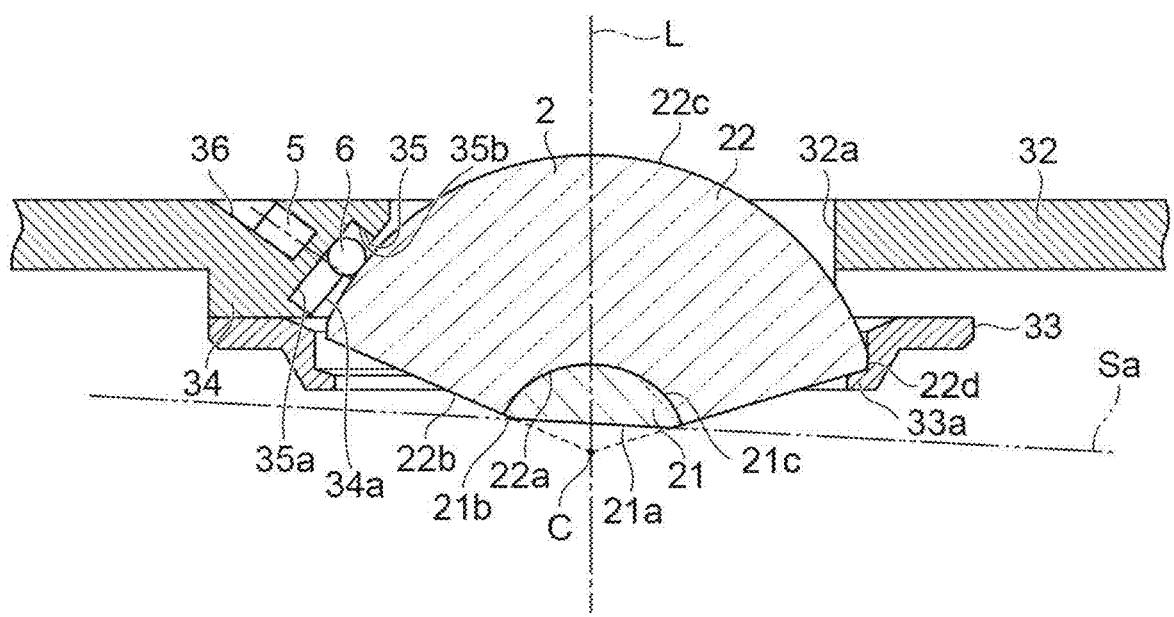
FIG. 7 is a cross-sectional view of a part of the solid immersion lens unit.

As illustrated in FIGS. 6 and 7, when the contact surface 21a of the solid immersion lens 2 is brought into close contact with the surface Sa of the semiconductor device S, the solid immersion lens 2 moves upward, and the third spherical surface 22c of the solid immersion lens 2 comes into contact with the sphere 6 rotatably held by the magnetic force of the magnet 5. At this time, as illustrated in FIG. 6, when the surface Sa of the semiconductor device S is not tilted with respect to the optical axis L (that is, orthogonal to the optical axis L), the solid immersion lens 2 hardly swings, and the contact surface 21a of the solid immersion lens 2 comes into close contact with the surface Sa of the semiconductor device S. On the other hand, as illustrated in FIG. 7, when the surface Sa of the semiconductor device S is tilted with respect to the optical axis L, the solid immersion lens 2 attempts to swing to follow the surface Sa of the semiconductor device S, and each sphere 6 rotates while the third spherical surface 22c of the solid immersion lens 2 and the surface of each sphere 6 are in point contact with each other. As a result, the solid immersion lens 2 swings smoothly to follow the surface Sa of the semiconductor device S. In this way, the contact surface 21a of the solid immersion lens 2 can be brought into close contact with the surface of the semiconductor device S. Note that factors that cause the surface Sa of the semiconductor device S to be tilted with respect to the optical axis L include poor polishing of the surface Sa, tilting of a mounting board on which the semiconductor device S is mounted, etc.

[Action and Effect]

In the solid immersion lens unit 1 described above, the solid immersion lens 2 includes the first lens portion 21 formed of the first material and the second lens portion 22 formed of the second material having the refractive index smaller than the refractive index of the first material and coupled to the first lens portion 21. In this way, a material having a wider bandgap than that of the first material can be selected as the second material. Therefore, for example, when compared to the case where the entire solid immersion lens 2 is formed of the first material, even when light having a short wavelength is used, it is possible to easily ensure the amount of light transmitted through the solid immersion lens 2. That is, while the first material has a restriction that a material having a high refractive index needs to be selected, the second material does not have such a restriction, so that a degree of freedom of selection is high. Therefore, as the second material, it is possible to select a material having a higher transmittance for light having a shorter wavelength than that of the first material. As a result, in the semiconductor inspection device 100 including the solid immersion lens unit 1, the light source of the LSM unit 115 can output light in a wavelength range absorbed to some extent by the first lens portion 21 (first material) and not absorbed by the second lens portion 22 (second material) (that is, transparent to the second lens portion 22). In this way, it is possible to increase the resolution, and it is possible to perform various measurements using generation of electric charges associated with light absorption in the semiconductor device S.

Further, the second lens portion 22 has the concave second spherical surface 22a facing the convex first spherical surface 21c of the first lens portion 21, and the convex third spherical surface 22c disposed to face the objective lens 150, and the contact portion 40 (sphere 6) of the holder 3 comes into contact with the third spherical surface 22c. In this way, the contact portion 40 comes into contact with the solid immersion lens 2 on the third spherical surface 22c wider than the first spherical surface 21c, so that the field of view of the solid immersion lens 2 can be ensured. Further, since the refractive index of the second lens portion 22 is larger than the refractive index of air, the field of view of the solid immersion lens 2 can be enlarged as compared with, for example, the case where the solid immersion lens 2 only has the first lens portion 21. Therefore, according to the solid immersion lens unit 1, it is possible to ensure the field of view of the solid immersion lens 2 while enabling observation using light having a short wavelength.

The centers of curvature of the first spherical surface 21c, the second spherical surface 22a, and the third spherical surface 22c coincide with each other. In this way, it is possible to favorably observe the semiconductor device S.

The contact surface 21a is a flat surface. In this way, the contact surface 21a can be easily brought into close contact with the surface Sa of the semiconductor device S.

The contact surface 21a protrudes to the opposite side from the objective lens 150 with respect to the second lens portion 22 in the direction parallel to the optical axis L of the objective lens 150. In this way, it is possible to avoid a decrease in observation accuracy due to the contact of the second lens portion 22 with the semiconductor device S. That is, stress concentration may occur at a boundary portion between the first lens portion 21 and the second lens portion 22, and it is difficult to improve processing accuracy of the boundary portion. Therefore, unlike the solid immersion lens unit 1, when adopting a configuration in which not only the contact surface 21a of the first lens portion 21 but also the second lens portion 22 comes into contact with the semiconductor device S, for example, since the boundary portion slightly protrudes, the contact surface 21a may not be favorably in contact with the surface Sa of the semiconductor device S, and the observation accuracy may decrease. In contrast, in the solid immersion lens unit 1, such a situation can be avoided, and a decrease in observation accuracy can be avoided.

The first material contained in the first lens portion 21 is Si, GaAs, GaP, Ge, diamond, SiC or GaN. In this way, the semiconductor device S can be observed with high resolution.

The second material contained in the second lens portion 22 is glass, polymer, sapphire, quartz, calcium fluoride, or magnesium fluoride. As described above, as the second material, it is possible to select a material having a lower refractive index than that of the first material.

The contact portion 40 includes the sphere 6 rotatably held at a position facing the third spherical surface 22c. A part of light incident on the solid immersion lens 2 is blocked by the sphere 6 and a structure holding the sphere 6 (for example, the protrusion 34). However, in the solid immersion lens unit 1, as described above, since the sphere 6 comes into contact with the solid immersion lens 2 on the third spherical surface 22c wider than the first spherical surface 21c and the second spherical surface 22a, the field of view of the solid immersion lens 2 can be ensured.

[Modifications]

Figure 8:
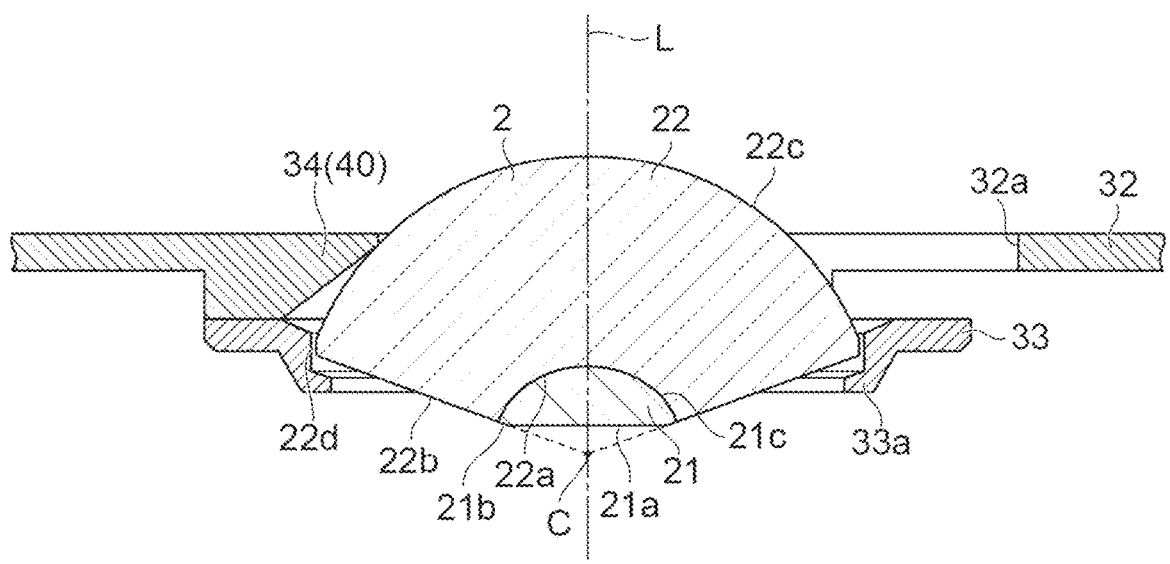
FIG. 8 is a cross-sectional view of a part of a solid immersion lens unit according to a first modification.
Figure 9:
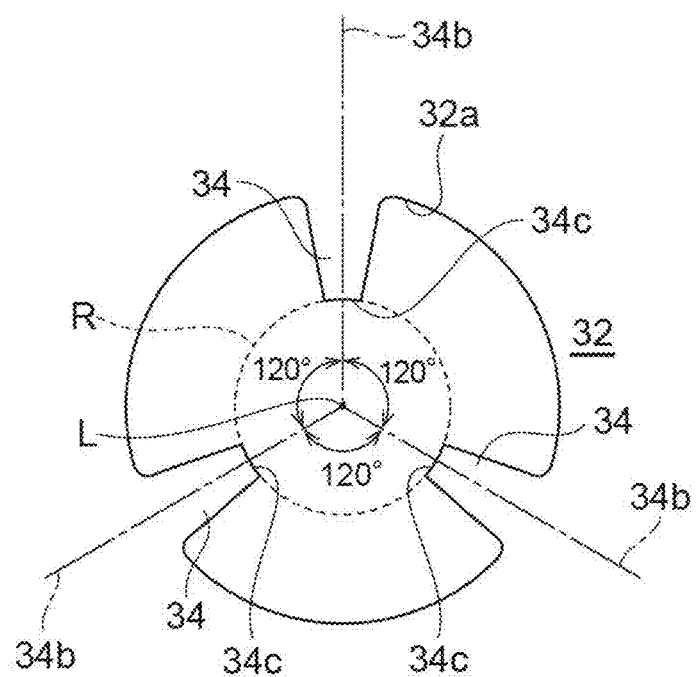
FIG. 9 is a top view of a bottom wall of a holder of the solid immersion lens unit according to the first modification.

In a first modification illustrated in FIG. 8, the contact portion 40 in contact with the third spherical surface 22c of the solid immersion lens 2 has a plurality of protrusions 34. Each of the protrusions 34 extends from an inner surface of the opening 32a toward a center of the opening 32a. As illustrated in FIG. 9, each protrusion 34 is configured as follows when viewed from the direction parallel to the optical axis L. Each protrusion 34 has a fan shape in which a length in a radial direction is longer than a length in a circumferential direction, and a center line 34b thereof extends to pass on the optical axis L. A tip surface 34c of each protrusion 34 has a curved surface and is located on a circumference R centered on the optical axis L. A contact position between each protrusion 34 and the third spherical surface 22c is located on the circumference R.

Figure 10:
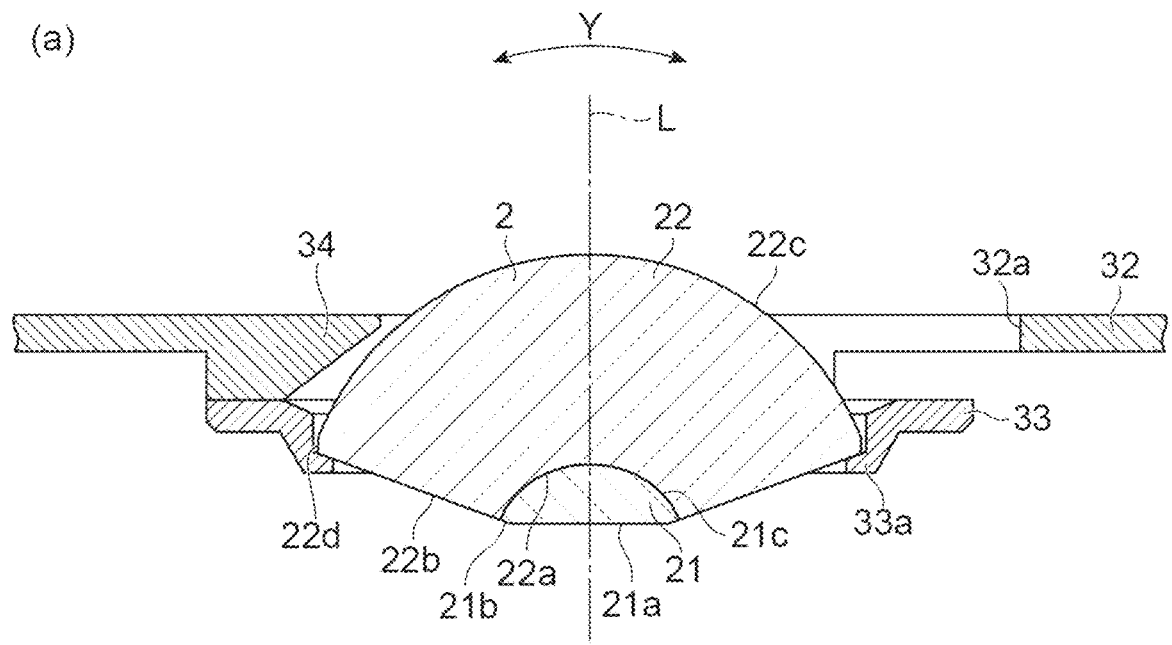
FIGS. 10(*a*) and 10(*b*) are cross-sectional views of a part of the solid immersion lens unit according to the first modification.
Figure 10:
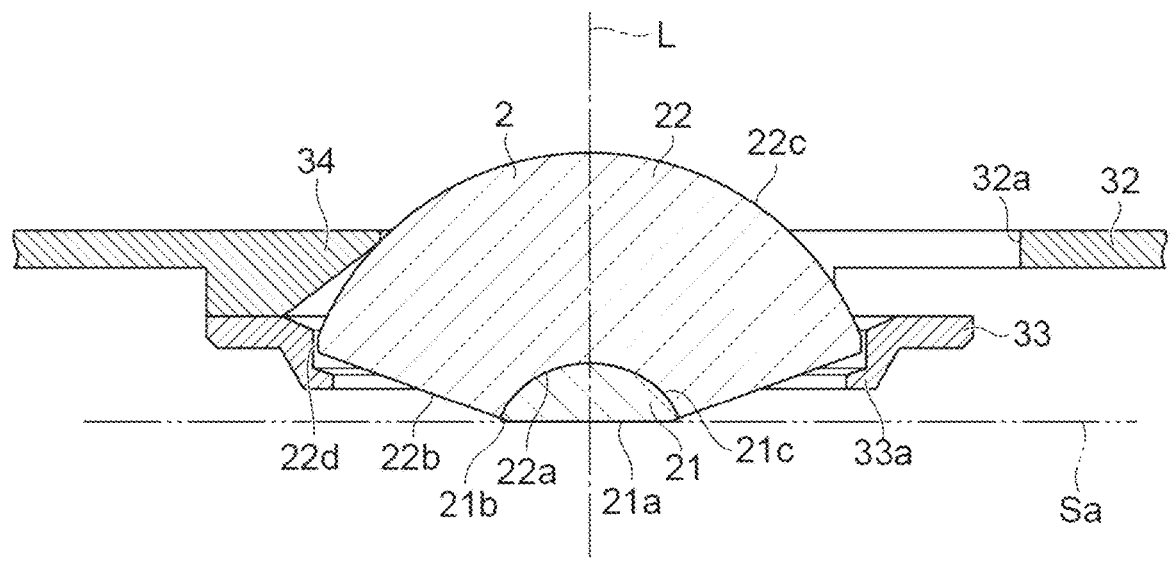

As illustrated in FIG. 10(a), in the state before the solid immersion lens 2 comes into contact with the semiconductor device S, the holder 3 holds the solid immersion lens 2 swingably in a direction of an arrow Y. The solid immersion lens 2 is supported by the support member 33. When the contact surface 21a is brought into contact with the surface Sa of the semiconductor device S from this state, as illustrated in FIG. 10(b), the solid immersion lens 2 is separated from the support member 33, and the third spherical surface 22c comes into contact with three protrusions 34. At this time, the solid immersion lens 2 swings or rotates, so that the contact surface 21a follows and comes into close contact with the surface Sa of the semiconductor device S. In this way, favorable close contact between the solid immersion lens 2 and the semiconductor device S can be obtained. As a result, for example, even when the surface Sa of the semiconductor device S is tilted with respect to the optical axis L, the semiconductor device S can be favorably observed.

In the first modification, the field of view of the solid immersion lens 2 can be ensured while enabling observation using light having a short wavelength, as in the above embodiment. Further, in the first modification, the contact portion 40 has the protrusion 34 extending from the inner surface of the opening 32a toward the center of the opening 32a. A part of light incident on the solid immersion lens 2 is blocked by the protrusion 34. However, as described above, since the protrusion 34 comes into contact with the solid immersion lens 2 on the third spherical surface 22c wider than the first spherical surface 21c, the field of view of the solid immersion lens 2 can be ensured.

Figure 11:
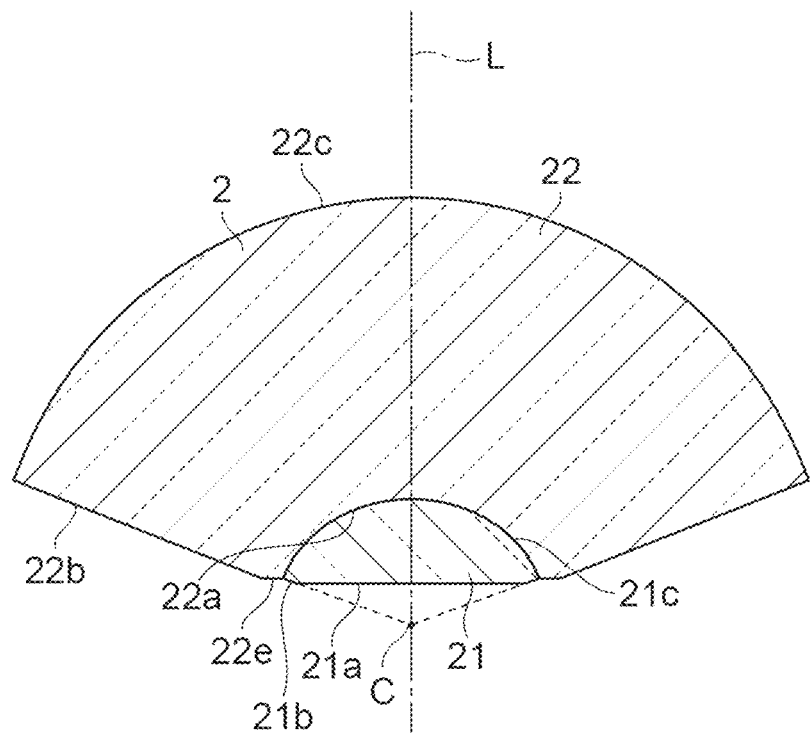
FIG. 11 is a cross-sectional view of a solid immersion lens according to a second modification.

In the second modification illustrated in FIG. 11, the second lens portion 22 does not include the peripheral surface 22d, and includes a flat surface 22e. The flat surface 22e extends parallel to the contact surface 21a and is connected to the first tapered surface 21b of the first lens portion 21 and the second tapered surface 22b. Since the flat surface 22e is provided, the second tapered surface 22b is not flush with and connected to the first tapered surface 21b. The apex of the virtual cone including the second tapered surface 22b is located below the centers of curvature of the first spherical surface 21c, the second spherical surface 22a, and the third spherical surface 22c. In the second modification as well, the contact surface 21a of the first lens portion 21 protrudes downward with respect to the second lens portion 22 (to the opposite side from the objective lens 150) in the direction parallel to the optical axis L of the objective lens 150. In the second modification, the field of view of the solid immersion lens 2 can be ensured while enabling observation using light having a short wavelength, as in the above embodiment.

The present disclosure is not limited to the above-described embodiment and modifications. The material and shape of each component are not limited to the above-mentioned material and shape, and various materials and shapes can be adopted. The shape of the solid immersion lens 2 is not limited to the hemispherical shape, and may be, for example, a Weierstrass shape. The contact surface 21a does not necessarily have to be a flat surface. The semiconductor device S may be formed by other indirect transition semiconductors such as diamond and germanium. When the substrate material is diamond, for example, light in an ultraviolet region is output from the light source of the LSM unit 115. When the substrate material is germanium, for example, infrared light in a wavelength range of about 1.8 µm is output from the light source of the LSM unit 115.

The centers of curvature of the first spherical surface 21c, the second spherical surface 22a, and the third spherical surface 22c do not have to coincide with each other. For example, when the first material contained in the first lens portion 21 is different from the substrate material of the semiconductor device S, the centers of curvature of the first spherical surface 21c, the second spherical surface 22a, and the third spherical surface 22c may be shifted from each other so that an aberration between the first lens portion 21 and the semiconductor device S is corrected.

The semiconductor inspection device 100 is not limited to an epi-illumination type device that brings the contact surface 21a of the solid immersion lens 2 into contact with the surface Sa of the semiconductor device S from the upper side, and may be an inverted device that brings the contact surface 21a into contact with the surface Sa from the lower side. In the inverted semiconductor inspection device 100, the third spherical surface 22c of the solid immersion lens 2 is in contact with the sphere 6 even when the contact surface 21a is not brought into contact with the surface Sa from the lower side. In this case, the contact surface 21a of the solid immersion lens 2 can be easily brought into close contact with the surface of the semiconductor device S.

REFERENCE SIGNS LIST

1: solid immersion lens unit, 2: solid immersion lens, 3: holder, 6: sphere (contact portion), 21: first lens portion, 21a: contact surface, 21c: first spherical surface, 22: second lens portion, 22a: second spherical surface, 22c: third spherical surface, 32a: opening, 34: protrusion (contact portion), 40: contact portion, 100: semiconductor inspection device, 111: stage, 112: optical system, 113: two-dimensional camera (photodetector), 115a: photodetector, 150: objective lens, L: optical axis, S: semiconductor device (observation object).

The invention claimed is:
1. A solid immersion lens unit comprising:
a solid immersion lens; and
a holder for swingably holding the solid immersion lens, wherein the solid immersion lens includes a first lens portion formed of a first material, and a second lens portion formed of a second material having a refractive index smaller than a refractive index of the first material and coupled to the first lens portion,
the first lens portion includes a contact surface for contacting with an observation object and a convex first spherical surface,
the second lens portion includes a concave second spherical surface facing the first spherical surface and a convex third spherical surface to be disposed to face an objective lens,
the holder has a contact portion configured to be contactable with the third spherical surface, and the contact surface protrudes to an opposite side from the objective lens with respect to the second lens portion in a direction of an optical axis of the objective lens such that the contact surface is positioned beyond the second lens portion.

2. The solid immersion lens unit according to claim 1, wherein centers of curvature of the first spherical surface, the second spherical surface, and the third spherical surface coincide with each other.

3. The solid immersion lens unit according to claim 1, wherein the contact surface is a flat surface.

4. The solid immersion lens unit according to claim 1, wherein the first material is Si, GaAs, GaP, Ge, diamond, SiC, or GaN.

5. The solid immersion lens unit according to claim 1, wherein the second material is glass, polymer, sapphire, quartz, calcium fluoride, or magnesium fluoride.

6. The solid immersion lens unit according to claim 1, wherein the contact portion includes a sphere rotatably held at a position facing the third spherical surface.

7. The solid immersion lens unit according to claim 1, wherein the holder is formed with an opening in which the second lens portion disposed, and the contact portion includes a protrusion extending from an inner surface of the opening toward a center of the opening.

8. A semiconductor inspection device comprising:

a stage on which a semiconductor device is placed, the semiconductor device being the observation object;

an optical system through which light from the semiconductor device passes; and a photodetector for detecting the light passing through the optical system, wherein the optical system includes an objective lens, and the solid immersion lens unit according to claim 1.

* * * * *